United States Patent [19]

Fontanilla

[11] Patent Number: 4,937,111
[45] Date of Patent: Jun. 26, 1990

[54] ADHESIVE TAPE FOR INSULATION APPLICATION

[75] Inventor: Dennis G. Fontanilla, East Hanover, N.J.

[73] Assignee: Compac Corporation, Netcong, N.J.

[21] Appl. No.: 185,193

[22] Filed: Jun. 13, 1988

Related U.S. Application Data

[62] Division of Ser. No. 33,203, Apr. 2, 1987, Pat. No. 4,778,703.

[51] Int. Cl.$^5$ .............................................. B32B 7/06
[52] U.S. Cl. .................................... 428/34.1; 428/40; 428/354
[58] Field of Search .................. 428/354, 40, 343, 77, 428/36

[56] References Cited

U.S. PATENT DOCUMENTS

| | | |
|---|---|---|
| 4,022,248 | 5/1977 | Hepner et al. |
| 4,084,035 | 4/1978 | Arpin et al. |
| 4,157,410 | 6/1979 | McClintock |
| 4,243,453 | 1/1981 | McClintock |
| 4,264,388 | 4/1981 | McClintock |
| 4,272,573 | 6/1981 | Ewald et al. |
| 4,288,480 | 9/1981 | Grzywinski et al. |
| 4,374,883 | 2/1983 | Winslow |
| 4,389,270 | 6/1983 | McClintock |
| 4,513,039 | 4/1985 | Esmay |
| 4,522,870 | 6/1985 | Esmay |
| 4,552,802 | 11/1985 | Mechin |
| 4,555,441 | 11/1985 | Rothenberg |
| 4,576,854 | 3/1986 | Kurahashi |
| 4,584,217 | 4/1986 | McClintock |
| 4,595,615 | 6/1986 | Cohen |

Primary Examiner—Alexander S. Thomas
Attorney, Agent, or Firm—Edgar A. Zarins; Malcolm L. Sutherland

[57] ABSTRACT

An adhesive tape construction adapted for use in an insulation system for pipes. The tape is applied to the insulation tube to seal the split so that the insulation can be secured in a closed position. The tape construction includes outer release liners which protect corresponding layers of conventional tacky adhesive utilized to secure the tape to the article. A central release liner is utilized to separate layers of the primary adhesive which, when joined, will seal the insulation tube. The primary adhesive has a chemical composition which gives it an affinity only for a similarly coated surface. The primary adhesive layers are preferably coated directly on the inner surfaces of the tacky adhesive. When using the tape construction to seal an insulation tube, the tape is first applied to the overlap flap of the insulation jacket by removing the outer release liners and applying the respective tacky adhesive surfaces to the mating surfaces of the flap. In this manner the insulation tube can be stored or shipped without damage. Upon application of the insulation tube, the flap is opened by removing the central release liner and mounting the insulation on the pipe. Thereafter, the insulation can be permanently sealed by joining the exposed surfaces of the primary adhesive. Since the primary adhesive will adhere only to itself, the insulation tube may be opened and closed several times before permanent application.

4 Claims, 1 Drawing Sheet

ADHESIVE TAPE FOR INSULATION APPLICATION

This is a divisional of co-pending application Ser. No. 033,203 filed on Apr. 2, 1987, now U.S. Pat. No. 4,778,703.

BACKGROUND OF THE INVENTION

I. Field of the Invention

This invention relates to an adhesive tape construction for use in sealing insulation first during storage of the insulation and permanently upon installation of the insulation and, in particular, to an adhesive tape construction which utilizes an adhesive material having an adhesive affinity only for similarly coated surfaces thereby preventing inadvertent adherence.

II. Description of the Prior Art

Conventionally, glues, heat, or solvent activatable adhesive films, or pressure sensitive adhesive films or tapes have been used to combine or join solid items. Generally, pre-applied pressure sensitive tapes have offered the greatest ease of handling and convenience although bond strength and the inherent problems associated with using adhesive materials which will adhere to anything they come into contact with has caused a continuous effort to improve the state of the art. This is particularly true in connection with adhesive tapes utilized to seal sections of insulation typically used in construction environments. Tapes, whether pressure-sensitive or not, used in sealing the sections of insulation, such as the overlapping ends of a pipe insulation jacket cover, may come into contact with dust particles or other materials which reduces the adhesive properties of the tape resulting in failure of the necessary seal.

Such tape systems, whether pressure sensitive or not, are applied in two different ways. A double-faced coated tape is applied to one surface and thereafter brought into contact with the other surface to join the two. Another system commonly utilized is the two-tape bonding method wherein one strip of tape is applied to one surface and another strip of tape is applied to the opposing surface wherein the bond is effected by bringing the two tape surfaces together, each of which has additional adhesive protected by a release liner. In a variation of this method, a single release liner is disposed between the adhesive surfaces of each tape in order to join the surfaces during storage. However, because it is often necessary to separate at least one of the adhesive surfaces from the center release liner, this surface can be exposed to dust and debris prior to final bonding resulting in a poor seal. In addition, it is often difficult to obtain exact registration of the adhesive layer with the central release liner if final bonding is not necessary resulting in a poor final bond. This may cause the insulation jacket to freely open resulting in damage to the insulation.

Currently, both supported and unsupported pressure sensitive tapes are used in the insulation industry to join and seal the overlapping ends of the vapor-barrier cover of the pipe insulation jacket. However, these well-known tape constructions do not develop the desired instantaneous bond, cannot be applied at sub-freezing temperatures, rely on coated release liners to obtain a temporary bonding cf the overlapping ends, and rely solely on pressure sensitive adhesive tapes.

SUMMARY OF THE PRESENT INVENTION

The present invention overcomes the disadvantages of the prior art by providing a tape construction for use in sealing insulation jackets for pipe systems wherein one surface of which is adherable by light pressure while the opposite surface is not adherable to any surface except a similarly coated surface.

A preferred embodiment of the tape according to the present invention comprises outer release liners which protect corresponding layers of a conventional tacky adhesive. Bonded to the interior surfaces of the tacky adhesive is a layer of the self-adhering adhesive composition. In order to separate these adhesive layers a central release liner is disposed therebetween. The tape construction is mounted to the overlapping ends of the insulation jacket by removing the outer release liners and placing the tacky adhesive surfaces of the tape in contact with the cooperating surfaces of the flap. Upon permanent installation of the pipe insulation the central release liner is removed to expose the primary adhesive surfaces which then can be brought into contact with each other to form a permanent bond.

The primary adhesive is a composition of unique polymers to achieve sub-freezing bondability without sacrificing elevated temperature properties. In addition, a higher interface bond strength is achieved through the use of fillers, reinforcers, adhesion promoters and surface modifiers. Furthermore, because of the properties of the primary adhesive, a non-release coated paper or plastic film of any polymeric material or color could be utilized to form a temporary adherent surface between the two non-pressure sensitive ape surfaces. Finally, because of these adhesive properties, the bonding surfaces are not susceptible to contamination by fiberglass particles, dust, grease, dirt or the like thereby resulting in an improved permanent bond.

Other objects, features and advantages of the present invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which the reference characters refer to like parts throughout the views and in which.

DETAILED DESCRIPTION OF A PREFERRED EMBODIMENT OF THE PRESENT INVENTION

Figure 1:
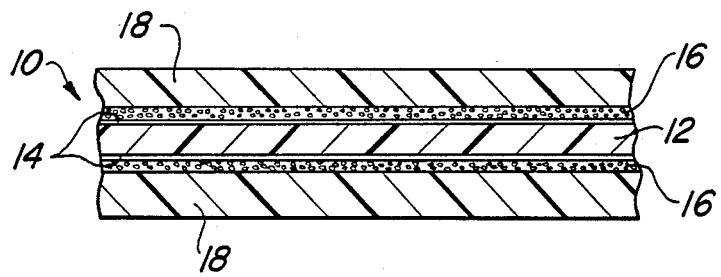
FIG. 1 is a cross-sectional view of one embodiment of a tape construction according to the present invention.
Figure 2:
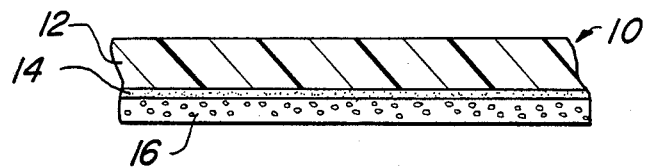
FIG. 2 is a cross-sectional view of another embodiment of a tape construction according to the present invention.

Referring first to FIGS. 1 and 2, there are shown alternate embodiments of a tape construction 10 for sealing abutting portions of insulation embodying the present invention. The tape construction 10 is specifically adapted for bonding and sealing the halves of a segment of pipe insulation generally shown in FIG. 3. The tape 10 is designed to allow application at the manufacturing facility in order to join the insulation segments during storage and transport thereby minimizing damage to the insulation while subsequently allowing convenient installation and sealing of the insulation on the job-site.

The first embodiment of the tape construction 10, shown in FIG. 1, comprises a central release liner or interleaver film 12 which acts to separate opposing layers of dry bonding adhesive 14. In turn, a layer of tacky, pressure sensitive adhesive 16 is affixed to the outer surfaces of the bonding adhesive 14. The pressure sensitive adhesive 16 is preferably coated, bonded, laminated or grafted to the bonding adhesive layer 14 in such a manner so as to unitize the two layers thereby resulting in enhanced performance of the permanent seal. In addition, because the pressure sensitive adhesive layer 16 is a conventional tacky, outer release liners 18 are utilized to protect the adhesive layers 16 until application. As is well known in the industry, the release liners 18 are preferably coated with a release coating, such as a silicone coating, in order to permit convenient removal of the liners 18.

In a second embodiment of the tape construction 10 (FIG. 2), which is utilized in a two-tape system, the central interleaver film 12 is not utilized to separate bonding adhesive layers. Instead, two separate tape constructions 10 are individually affixed to the surfaces to be sealed. Specifically, the two-tape construction includes a layer of pressure sensitive adhesive 16, which is utilized to mount the tape 10 to the respective surface, a layer of bonding adhesive 14, and a protective liner 12 to prevent mating layers of bonding adhesive from inadvertently coming into contact with each other. Since this tape 10 is normally stored in a roll, the protective liner 12 also acts as a release barrier for contiguous layers of the tape 10 and, specifically, the pressure sensitive adhesive 16. In a still further variation, only one of the tape strips of the two-tape system need have the protective release liner 12 since the bonding adhesive 14 only has a bonding affinity for similarly coated surfaces. Thus, the one protective liner 12 is sufficient to prevent permanent bonding of the adhesive layers 14 of the two tape constructions.

The composition of the adhesive layers and the bonding formation between them facilitates a convenient and permanent seal when tape constructions are joined. Under a preferred embodiment, the bonding adhesive film 14 is formulated from natural or synthetic materials such as polyisoprene, polybutadiene, polyisobutylene, polybutene, polyisobutene with a diene component, polyacrylates and a mixture thereof. Generally, this bonding adhesive is in the range of one-tenth of one-thousandths to five-thousandths of an inch in thickness. In contrast, the pressure sensitive adhesive film is in the range of one-thousandths to five-thousandths of an inch in thickness. Preferably, the pressure sensitive adhesive is a high performance adhesive polymerized from such basic film forming monomers as 2-ethyl hexyl acrylate, butyl acrylate, methyl methacrylate acrylic acid, methacrylic acid, styrene, or butyl acetate. In addition, resins, anti-oxidants, fillers and extenders, coolants, plasticizers, heat stabilizers, flame retardants, ultraviolet stabilizers, processing aids, adhesion promoters, cross-linking agents, and other enhancement additives may be added to either adhesive as is well known in the art. As a further enhancement, the adhesives have low glass transition temperatures which allows the tape to be applied in below freezing temperatures yet capable of withstanding elevated temperatures.

In a preferred embodiment of the bonding adhesive film 14, the liquid adhesive 14 preferably comprises 50% to 75% by weight of a natural rubber latex, 1% to 25% of a curing agent, 1% to 25% of an antioxidant/accelerator, up to 3% of a thickener depending upon the desired viscosity of the liquid adhesive, up to 3% of an alkalinity adjuster in order to raise the compound's pH above 9.0 with the remainder of the liquid adhesive comprising a reinforcer/filler. By way of specific example, an effective bonding adhesive 14 has been developed by combining 100 gms (64.1%) of a low-ammonia natural latex manufactured by Firestone Synthetic Rubber & Latex Company under the name Hartex 103; 10 gms. (6.41%) of a 50% zinc oxide slurry manufactured by Technical Industries, Inc. under the name Ti-Rite CC-1 which acts as the curing agent; 2 gms. (1.28%) of a 50% zinc di-n-butyldithiocarbamate slurry manufactured by R. T. Vanderbilt Company, Inc. under the registered trademark Butyl Zimate which acts as an accelerator/antioxidant; 2 gms. (1.28%) of a low viscosity sodium polyacrylate thickener such as that manufactured by Para-Chem Southern, Inc. under the name Paragum 141 or by Rohm And Haas Company under the registered trademark Acrysol; 2 gms. (1.28%) of ammonium hydroxide to adjust the alkalinity of the film to a pH above 9.0; and the remainder (40 gms./25.64%) milled fiberglas fibers manufactured by Henry & Frick, Inc. under the trademark Microglass. The Firestone Hartex 103 latex consists of a low ammonia concentration in combination with 0.02% sodium dimethyldithiocarbamate and 0.027% zinc oxide and has a 60% dry rubber content with a pH of 9.8. The Ti-Rite CC-1 curing agent slurry is a water based dispersion of zinc oxide and an antioxidant manufactured by Goodyear Tire & Rubber Company under the name Wingstay L (also known as a polymeric hindered phenol). The Butyl Zimate accelerator slurry functions as a nondiscoloring antioxidant with a zinc content of 13–15%. Although not critical to the tape construction, the thickening agent facilitates application of the bonding adhesive to the tape construction. The Acrysol ASE-95 thickening agent is an alkali soluble emulsion containing acrylic emulsion copolymers supplied at high solids and low viscosity for easy mixing. In contrast, Paragum 141 is a low viscosity sodium polyacrylate thickener that lends itself to latex compounding systems including natural latex. Finally, the Microglass milled fibers are used as a reinforcer to enhance the bond between tape segments while also increasing the strength and dimensional stability of the tape while minimizing distortion at elevated temperatures.

Figure 3:
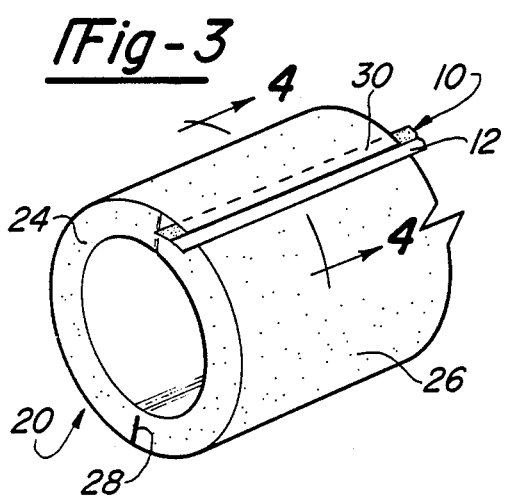
FIG. 3 is an elevational perspective of a pipe insulation jacket having the tape construction of the present invention joining the ends of the insulating jacket cover.
Figure 4:
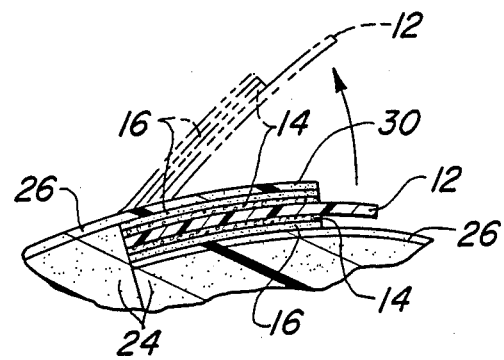
FIG. 4 is a cross-sectional view of a portion of the insulation jacket taken along line 4—4 of FIG. 3.
Figure 6:
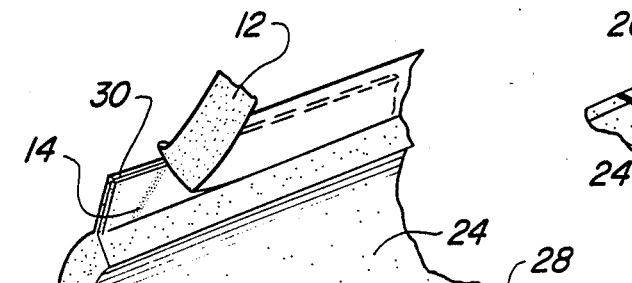
FIG. 6 is a cross-sectional view of a portion of the insulation jackets showing the adhesive layers of the tape construction permanently joined to provide a bonding seal of the insulation jacket.
Figure 5:
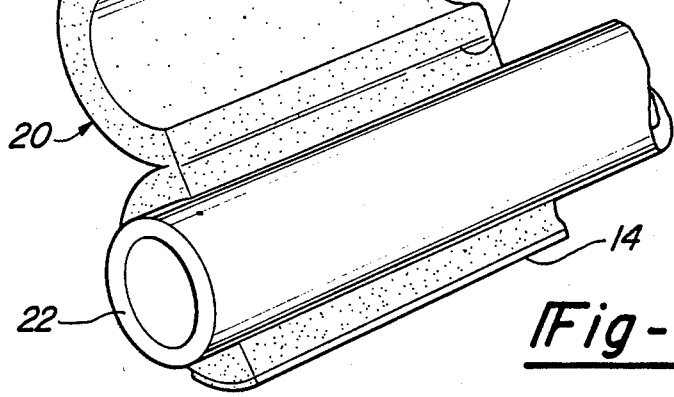
FIG. 5 is an elevational perspective of the insulation jacket in an open position with a pipe therein, an exposed tape layer fixed to one longitudinal end portion of the jacket and the partial removal of a central release liner exposing a tape layer on the remaining longitudinal end portion of the jacket.

Referring now generally to FIGS. 3 through 6, the tape 10 is particularly useful in joining and sealing an insulation jacket 20 about a pipe 22 such as the type used in dwellings, commercial buildings, or industrial plants to carry steam, hot and cold water, chemicals or petroleum products. These pipes 22 may be made of copper, steel, aluminum, plastic, rubber or other similar materials. The insulation jacket 20 includes a tubular fiberglass-based body 24 and an outer moisture resistant covering 26 which extends circumferentially around the body 24. In order to facilitate installation of the insulation 20, the tubular body 24 is preferably split into two symmetric halves which are joined along at least one common edge 28 thereof by the covering 26. In this manner, the covering 26 acts as a hinge, as shown in FIG. 5, to allow the insulation 20 to be mounted about the pipe 22. In addition, the covering 26 seals this hinged split 28 in order to maintain the insulating properties of the insulation 20.

However, in order to fully maintain the insulating integrity it is necessary to cover and seal the remaining longitudinal split upon installation. As is shown in the drawings, the tape construction 10 is utilized to not only permanently seal the split but also join the insulation portions during storage or transport (FIG. 3). Preferably, the covering 26 includes an overlapping flap 30 which forms a longitudinal edge thereof. The flap 30 overlaps the opposite edge of the covering 26 and therefore the split. In accordance with the first embodiment of the present invention, the tape 10 is secured to the underside of the flap 30 by removing one of the outer release liners 18 of the tape 10 and applying he exposed pressure sensitive adhesive layer 16 to the underside cf the flap 30. Similarly, to join the halves of the insulation jacket 20 for storage, etc., the other release liner 18 is removed exposing the other pressure sensitive adhesive layer 16 which is attached to the outer surface of the covering 26 on the opposite edge of the insulation 20 as shown in FIG. 4.

With the tape construction 10 attached to the insulation 20, the covering can be opened and closed as necessary prior to permanent installation. As is best shown in FIG. 4, the interleaver film 12 extends beyond the edge of the adhesive layers to permit the user to conveniently separate the interleaver from one or both of the layers of bonding adhesive. The interleaver is formed of a low surface energy film such as polyethylene and polypropylene which have a sufficient attraction to the bonding adhesive yet is easily removable therefrom. Thus, to open the insulation tube 20 for installation, the interleaver 12 is separated from one bonding adhesive layer 14 (shown in phantom in FIG. 4) and the tube 20 is opened to be placed about the pipe 22 (FIG. 5). The insulation tube 20 can be rejoined without effecting a permanent bond simply by again placing the interleaver 12 in contact with the adhesive layer 14. When it is desired to permanently bond the overlap thereby sealing the insulation jacket, the interleaver 12 is removed and discarded from the tape construction 10 and the two bonding adhesive layers 14 are joined.

The two-tape adhesive system operates in a similar manner to permanently join and seal the pipe insulation 20. A length of tape 10 is affixed to both the underside of the overlapping flap 30 and the opposing edge of the covering 26 by pressing the adhesive layer 16 against the respective surface. If it is desired to temporarily join the two portions of the insulation 20, the interleaver film 12 from either tape 10 is removed thereby allowing the bonding adhesive layer 14 to come into contact with the interleaver 12 of the other tape segment. As with the one tape construction, once the insulation tube 20 is installed, the longitudinal split can be sealed by removing the liners 12 and joining the bonding adhesive layers 14.

Thus the present invention provides a tape construction and insulation system which allows pre-assembly of the insulation tube so as to prevent damage thereto prior to permanent installation and permanent sealing of the insulation upon final installation. The unique properties of the bonding adhesive improve the insulating properties of the system by ensuring a permanent seal which is not affected by contaminants such as grease, dust and fiberglass particles which will not adhere to the bonding adhesive layers.

The foregoing detailed description has been given for clearness of understanding only and no unnecessary limitations should be understood therefrom as some modifications will be obvious to those skilled in the art without departing from the scope and spirit of the invention as defined in the appended claims.

I claim:

1. A system for insulating a pipe comprising:
   a length of tubularly shaped pipe insulation having a flexible outer cover secured thereto and a longitudinal split extending the length of said insulation, said cover having an overlapping flap forming a longitudinal edge thereof and being adapted to overlap an opposite edge of said cover when the insulation is installed on the pipe;
   means for detachably joining said overlapping flap to said opposite edge prior to permanent installation of said insulation; and
   means for permanently bonding said overlapping flap to said opposite edge to seal abutting portions of said insulation;
   said means for joining and said means for bonding comprising a tape construction having outer layers of pressure sensitive adhesive for joining said tape to said flap and said opposite edge, inner layers of bonding adhesive affixed to an inner surface of said layers of pressure sensitive adhesive for permanently bonding said flap to said opposite edge, and a removable interleaver film disposed between said bonding adhesive layers, said bonding adhesive layers having a bonding affinity only for each other thereby preventing adhesion thereof to other surfaces.

2. The insulating system as defined in claim 1 wherein said bonding adhesive layers are separated by said removable interleaver film prior to permanent installation of said insulation whereby said film is removed in order to join said layers of bonding adhesive.

3. The insulating system as defined in claim 1 wherein said tape construction includes outer release liners affixed to outer surfaces of said pressure sensitive adhesive, said release liners being removed prior to joining said tape to said flap and said opposite edge.

4. The insulating system as defined in claim 1 wherein said bonding adhesive comprises an elastomeric film containing material selected from the group consisting of styrene butadiene, polybutadiene, polyisobutylene, polyacrylates, polyvinyl acetates, polybutene, polyisoprene, polyisobutene, and a mixture thereof.

* * * * *